(12) United States Patent
Kim

(10) Patent No.: US 12,233,867 B2
(45) Date of Patent: Feb. 25, 2025

(54) DRIVER ASSISTANCE SYSTEM AND CONTROL METHOD THEREOF

(71) Applicant: HL KLEMOVE CORP., Incheon (KR)

(72) Inventor: Hyeongtae Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 202 days.

(21) Appl. No.: 17/580,508

(22) Filed: Jan. 20, 2022

(65) Prior Publication Data
US 2022/0234582 A1 Jul. 28, 2022

(30) Foreign Application Priority Data
Jan. 22, 2021 (KR) .................. 10-2021-0009196

(51) Int. Cl.
*B60W 30/12* (2020.01)
*B60W 10/20* (2006.01)
*B60W 50/10* (2012.01)

(52) U.S. Cl.
CPC ............ *B60W 30/12* (2013.01); *B60W 10/20* (2013.01); *B60W 50/10* (2013.01); *B60W 2710/202* (2013.01)

(58) Field of Classification Search
CPC .... B60W 30/12; B60W 10/20; B60W 30/182; B60W 40/06; B60W 50/08; B60W 2710/202; B60W 2540/20; B60W 2552/53; B60W 2554/802; B60W 50/082; B60W 50/085; B60W 50/10
See application file for complete search history.

(56) References Cited

U.S. PATENT DOCUMENTS

| | | | | |
|---|---|---|---|---|
| 8,965,633 | B2 * | 2/2015 | Lee | B62D 6/02 701/44 |
| 10,315,651 | B2 * | 6/2019 | Fiaschetti | B60W 30/12 |
| 11,518,375 | B2 * | 12/2022 | Ike | B60W 10/18 |
| 2006/0089770 | A1 * | 4/2006 | Ito | B62D 1/286 180/443 |
| 2009/0216404 | A1 * | 8/2009 | Maass | B62D 15/025 701/41 |
| 2012/0316699 | A1 * | 12/2012 | Filev | B60W 40/09 701/1 |
| 2013/0060413 | A1 * | 3/2013 | Lee | B62D 6/00 701/23 |

(Continued)

FOREIGN PATENT DOCUMENTS

| | | | | |
|---|---|---|---|---|
| DE | 102015015410 A1 * | 12/2016 | | B60W 30/12 |
| KR | 10-2013-0091414 | 8/2013 | | |
| KR | 10-2015-0058901 | 5/2015 | | |

*Primary Examiner* — Dale Moyer
(74) *Attorney, Agent, or Firm* — WOMBLE BOND DICKINSON (US) LLP

(57) ABSTRACT

Disclosed is a driver assistance system, which performs lane following assist control to keep a vehicle in the center of a lane by generating a required steering torque by a lane following assist system, including a controller configured to determine whether a driving situation is a situation in which steering intervention of a driver is required when the lane following assist control is performed, and adjust at least one of an attenuation amount of a required steering torque and a threshold value of a driver override determination for determining a driver override when the driving situation is the situation in which the steering intervention of the driver is required.

16 Claims, 7 Drawing Sheets

(56) References Cited

U.S. PATENT DOCUMENTS

| | | | |
|---|---|---|---|
| 2015/0348418 A1* | 12/2015 | Pfeiffer | G08G 1/167 |
| | | | 340/435 |
| 2017/0101094 A1* | 4/2017 | Fiaschetti | B60W 30/12 |
| 2018/0273089 A1* | 9/2018 | Isomoto | B62D 6/001 |
| 2019/0084581 A1* | 3/2019 | Miura | B60W 50/00 |
| 2020/0039584 A1* | 2/2020 | Igarashi | B62D 6/00 |
| 2021/0155232 A1* | 5/2021 | Ike | B60W 30/0956 |
| 2021/0284235 A1* | 9/2021 | Eguchi | B60Q 9/00 |

* cited by examiner

FIG. 7

| DRIVING SITUATION | | ATTENUATION AMOUNT OF REQUIRED STEERING TORQUE / THRESHOLD VALUE OF OVERRIDE DETERMINATION |
|---|---|---|
| VIRTUAL LANE CREATION | | AGGRESSIVE ATTENUATION / THRESHOLD VALUE DECREASE |
| PRECEDING VEHICLE FOLLOWING | | AGGRESSIVE ATTENUATION / THRESHOLD VALUE DECREASE |
| DRIVING MODE | Normal | NORMAL ATTENUATION / REFERENCE THRESHOLD VALUE |
| | Eco / Comfort | NORMAL ATTENUATION / REFERENCE THRESHOLD VALUE |
| | Sport | AGGRESSIVE ATTENUATION / THRESHOLD VALUE DECREASE |
| DIRECTION INDICATOR LAMP / EMERGENCY LIGHT APPLICATION | | AGGRESSIVE ATTENUATION / THRESHOLD VALUE DECREASE |
| NON-HIGHWAY | | NORMAL ATTENUATION / REFERENCE THRESHOLD VALUE |

DRIVER ASSISTANCE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2021-0009196, filed on Jan. 21, 2021, in the Korean Intellectual Property Office, the disclosure of which is incorporated by reference herein in its entirety.

BACKGROUND

1. Field

The disclosure relates to a driver assistance system and a control method thereof.

2. Description of the Related Art

In general, a driver assistance system is a device that recognizes a lane in which a vehicle travels and keeps the lane without manipulation of a steering wheel by a driver. In particular, a lane following assist system is a system that assists a driver in steering operation by recognizing a lane from a front camera and generating an appropriate steering torque so that a vehicle may travel along the center of the lane.

A conventional lane following assist system is designed such that a vehicle follows the center of a lane according to basic rules even in various driving situations. For example, when one of both lanes is unrecognized, the vehicle creates a virtual lane based on the opposite lane and follows the center of the virtual lane, or when the both lanes are unrecognized and there is a vehicle in front, the vehicle follows the vehicle in front.

An actual driving direction desired by a driver may be different from a road on which the system is following a center of a lane. The driver may need to change a lane in order to drive straight ahead depending on a driving situation. In this case, when the driver operates a steering wheel to change the lane in order to drive straight ahead, a steering torque required to keep the center of the current lane may interfere with this operation of the driver. Therefore, a sense of incongruity may be given to steering of the driver, so that the driver may feel uncomfortable.

As such, because the operation of the conventional lane following assist system is uniformly performed regardless of driving situations, in a driving situation in which steering of a driver needs to be intervened, a sense of incongruity may be given to steering of the driver.

SUMMARY

It is an aspect of the disclosure to provide a driver assistance system capable of reducing a sense of incongruity for steering of a driver and improving completeness of a system by adjusting an attenuation amount of a required steering torque of the system and a threshold value of driver override determination depending on a driving situation while the lane following assist system is operating, and a control method thereof.

Additional aspects of the disclosure will be set forth in part in the description which follows and, in part, will be obvious from the description, or may be learned by practice of the disclosure.

In accordance with an aspect of the disclosure, a driver assistance system, which performs lane following assist control to keep a vehicle in the center of a lane by generating a required steering torque by a lane following assist system, including a controller configured to determine whether a driving situation is a situation in which steering intervention of a driver is required when the lane following assist control is performed, and adjust at least one of an attenuation amount of a required steering torque and a threshold value of a driver override determination for determining a driver override when the driving situation is the situation in which the steering intervention of the driver is required.

The controller may be configured to determine that the driving situation is the situation in which the steering intervention of the driver is required when the driving situation is a virtual lane creation situation.

The controller may be configured to determine that the driving situation is the virtual lane creation situation when one lane of driving lanes is unrecognized, a branching lane, or has a lane width wider than a reference lane width while the lane following assist control is being performed.

The controller may be configured to determine that the driving situation is the situation in which the steering intervention of the driver is required when the driving situation is a preceding vehicle-following situation.

The controller may be configured to determine that the driving situation is the situation in which the steering intervention of the driver is required when the driving situation is a driving mode situation in which intervention of the driver is high.

The driving mode of the vehicle may include a Normal mode, an Eco mode, a Comfort mode, and a Sport mode that prioritizes power performance over fuel efficiency compared to the modes, and the controller may be configured to determine that the driving situation is a situation in which the intervention of the driver is high when the driving mode is the Sport mode.

The controller may be configured to determine that the driving situation is the situation in which the steering intervention of the driver is required when the driving situation is a direction indicator lamp or emergency light application situation.

The controller may be configured to, when the driving situation is the situation in which the steering intervention of the driver is required, increase the attenuation amount of the required steering torque more than an attenuation amount of a required steering torque in a normal driving situation.

The attenuation amount of the required steering torque in the driving situation in which the steering intervention of the driver is required is attenuated may be attenuated twice as much as the attenuation amount of the required steering torque in the normal driving situation.

The controller may be configured to, when the driving situation is the situation in which the steering intervention of the driver is required, adjust the threshold value of the driver override determination to be a threshold value decreased more than a reference threshold value in a normal driving situation.

The reference threshold value may be 2.0 Nm, and the decrease in the threshold value may be 0.5 Nm.

In accordance with an aspect of the disclosure, a driver assistance system, which performs lane following assist control to keep a vehicle in the center of a lane by generating a required steering torque by a lane following assist system, including a controller configured to determine a driving situation when the lane following assist control is performed, determine at least one of an attenuation amount of a required steering torque and a threshold value of a driver override determination for determining a driver override depending on the determined driving situation, and apply at least one of the determined attenuation amount of the required steering torque and the determined threshold value of the driver override determination to the lane following assist control.

In accordance with an aspect of the disclosure, a control method of a driver assistance system, which performs lane following assist control to keep a vehicle in the center of a lane by generating a required steering torque by a lane following assist system, including determining whether a driving situation is a situation in which steering intervention of a driver is required when the lane following assist control is performed, and adjusting at least one of an attenuation amount of a required steering torque and a threshold value of a driver override determination for determining a driver override when the driving situation is the situation in which the steering intervention of the driver is required.

The determining of whether the driving situation is the situation in which the steering intervention of the driver is required may include determining that the driving situation is the situation in which the steering intervention of the driver is required when the driving situation is a virtual lane creation situation.

The determining of whether the driving situation is the situation in which the steering intervention of the driver is required may include determining that the driving situation is the virtual lane creation situation when one lane of driving lanes is unrecognized, a branching lane, or has a lane width wider than a reference lane width while the lane following assist control is being performed.

The determining of whether the driving situation is the situation in which the steering intervention of the driver is required may include determining that the driving situation is the situation in which the steering intervention of the driver is required when the driving situation is a preceding vehicle-following situation.

The driving mode of the vehicle may include a Normal mode, an Eco mode, a Comfort mode, and a Sport mode that prioritizes power performance over fuel efficiency compared to the modes, and the determining of whether the driving situation is the situation in which the steering intervention of the driver is required may include determining that the driving situation is a situation in which the intervention of the driver is high when the driving mode is the Sport mode.

The determining of whether the driving situation is the situation in which the steering intervention of the driver is required may include determining that the driving situation is the situation in which the steering intervention of the driver is required when the driving situation is a direction indicator lamp or emergency light application situation.

The adjusting of at least one of the attenuation amount of the required steering torque and the threshold value of the driver override determination may include, when the driving situation is the situation in which the steering intervention of the driver is required, increasing the attenuation amount of the required steering torque more than an attenuation amount of a required steering torque in a normal driving situation.

The adjusting of at least one of the attenuation amount of the required steering torque and the threshold value of the driver override determination may include, when the driving situation is the situation in which the steering intervention of the driver is required, decreasing the threshold value of the driver override determination more than a threshold value of a driver override determination in a normal driving situation.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a table illustrating adjustment of the attenuation amount of the required steering torque and the threshold value of the driver override determination for each driving situation in the driver assistance system according to an embodiment.

DETAILED DESCRIPTION

Figure 1:
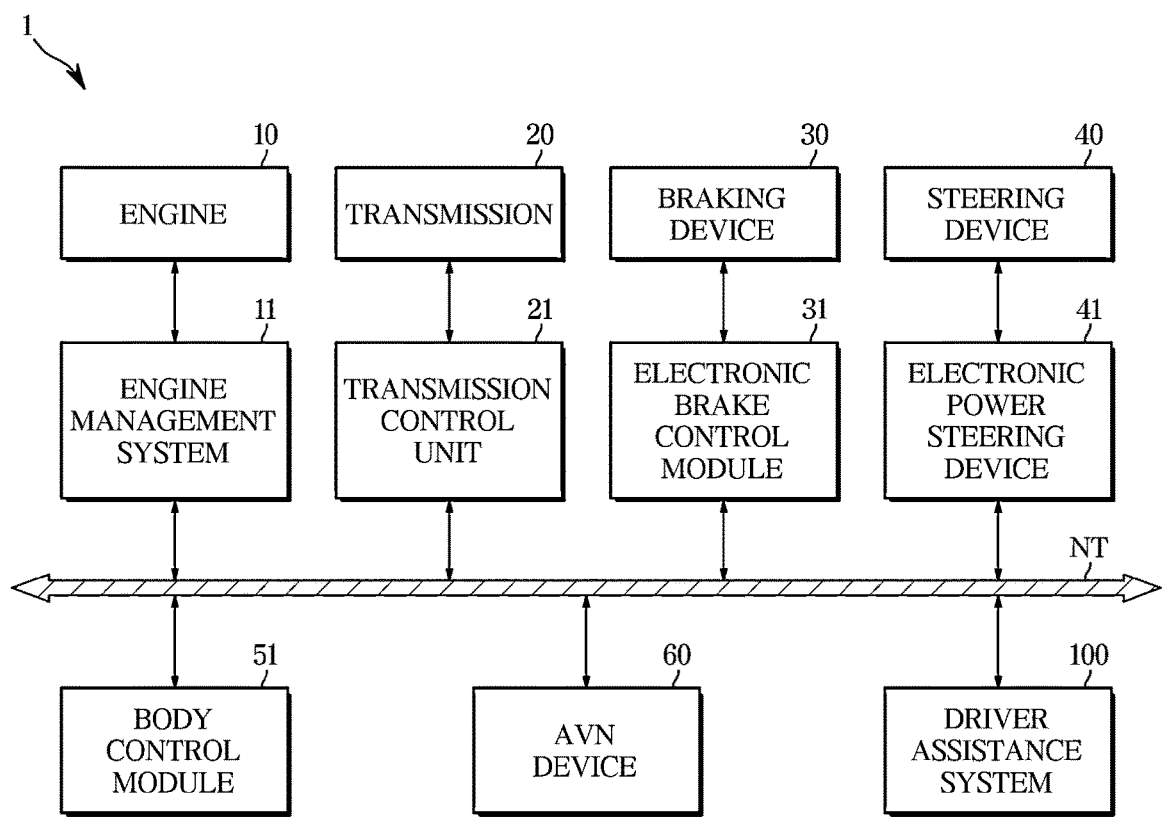
FIG. 1 is a configuration diagram of a vehicle equipped with a driver assistance system according to an embodiment.

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms " " "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 is a configuration diagram of a vehicle equipped with a driver assistance system according to an embodiment.

Referring to FIG. 1, a vehicle 1 includes an engine 10, a transmission 20, a braking device 30, and a steering device 40.

The engine 10 includes a cylinder and a piston and may generate power for the vehicle 1 to travel.

The transmission 20 includes a plurality of gears, and may transmit power generated by the engine 10 to wheels.

The braking device 30 may decelerate the vehicle 1 or stop the vehicle 1 through friction with the wheels.

The steering device 40 may change a driving direction of the vehicle 1.

The vehicle 1 may comprise a plurality of electrical components. For example, the vehicle 1 includes an engine management system (EMS) 11, a transmission control unit (TCU) 21, and an electronic brake control module 31, an electronic power steering (EPS) 41, a body control module (BCM) 51, and a driver assistance system (DAS) 100.

The engine management system 11 may control the engine 10 in response to an acceleration intention of a driver through an accelerator pedal or a request from the driver assistance system 100. For example, the engine management system 11 may control a torque of the engine 10.

The transmission control unit 21 may control the transmission 20 in response to a shift command of the driver through a shift lever and/or a driving speed of the vehicle 1. For example, the transmission control unit 21 may adjust a shift ratio from the engine 10 to the wheels.

When the vehicle 1 is an electric vehicle, the engine 10, the transmission 20, the engine management system 11, and the transmission control unit 21 may be excluded from the components of the vehicle 1.

The electronic brake control module 31 may control the braking device 30 in response to a braking intention of the driver through a brake pedal and/or slip of the wheels. For example, the electronic brake control module 31 may temporarily release the braking of the wheels in response to the slip of the wheels sensed during braking of the vehicle 1 (anti-lock braking systems; ABS). The electronic brake control module 31 may selectively release the braking of the wheels in response to oversteering and/or understeering sensed during steering of the vehicle 1 (electronic stability control; ESC). In addition, the electronic brake control module 31 may temporarily brake the wheels in response to the slip of the wheels sensed during driving of the vehicle 1 (traction control system; TCS).

The electronic power steering device 41 may assist an operation of the steering device 40 so that the driver may easily operate a steering wheel in response to a steering intention of the driver through the steering wheel. For example, the electronic power steering device 41 may assist the operation of the steering device 40 to decrease a steering force during low-speed driving or parking and to increase the steering force during high-speed driving.

The body control module 51 may control the operation of the electronic components to provide convenience to the driver or ensure the safety of the driver or may check the state. For example, the body control module 51 may control a head lamp, a wiper, a cluster, a multifunction switch, an emergency light, a direction indicator lamp, and the like.

An AVN device 60 may be provided in the center fascia of the vehicle 1. The AVN device 60 may include a display 61 and an audio device 62. Speakers installed on a dashboard and a door of the vehicle 1 may be understood to be included in the AVN device 60. The display 61 may output a screen, and the audio device 62 may output a sound. The display 61 may display a graphic user interface (GUI) that may interact with a ser.

The display of the AVN device 60 may be a light emitting diode (LED) panel, an organic light emitting diode (OLE©) panel, or a liquid crystal display (LCD) panel.

The AVN device 60 may include various input buttons. The display 61 of the AVN device 60 may also include a touch panel. The AVN device 60 may execute various functions based on a user command input through the input buttons or the touch panel. For example, the AVN device 60 may perform a navigation function, a DMB function, an audio function, and/or a video function.

The driver assistance system 100 may assist the driver to operate (drive, brake, and steer) the vehicle 1. For example, the driver assistance system 100 may detect an environment (e.g., other vehicles, pedestrians, cyclists, lanes, road signs, etc.) around the vehicle 1, and control the driving and/or braking and/or steering of the vehicle 1 in response to the detected environment.

The driver assistance system 100 may provide various assistance functions. For example, the driver assistance system 100 may provide a lane departure warning (LDW) system, lane keeping assist (LKA), lane following assist (LFA), high beam assist (HBA), automatic emergency braking (AEB), traffic sign recognition (TSR), smart cruise control (SCC), and/or blind spot detection (BSD) functions. Each of these functions may be implemented as a separate system.

The above electronic components may communicate with each other through a vehicle communication network NT. For example, the electronic components may transmit and receive data through Ethernet, Most Oriented Systems Transport (MOST), Flexray, CAN (Controller Area Network), LIN (Local Interconnect Network), etc. For example, the driver assistance system 100 may transmit a drive control signal, a braking signal, and/or a steering signal to the engine management system 11, the electronic brake control module 31, and/or the electronic power steering device 41 through the vehicle communication network NT, respectively.

Figure 2:
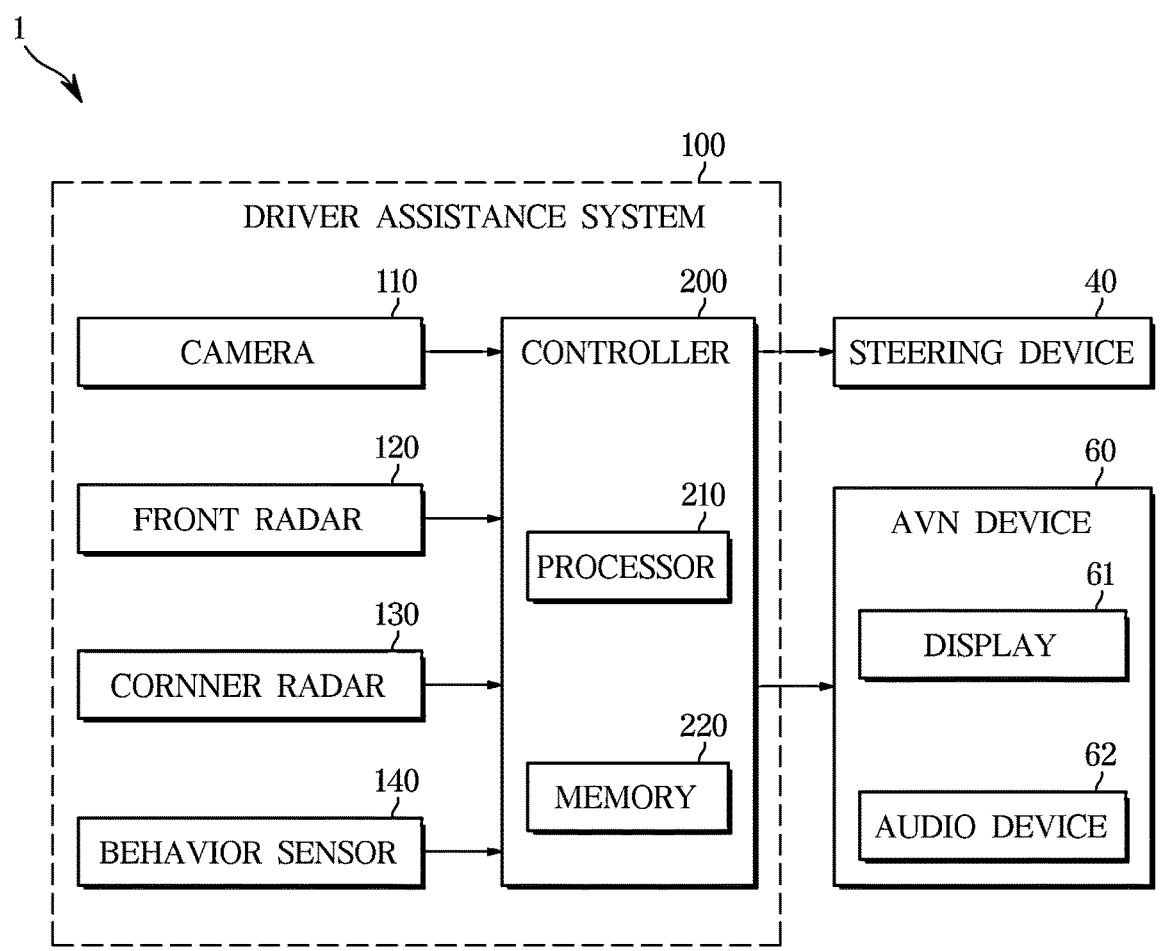
FIG. 2 is a control block diagram of the driver assistance system according to an embodiment.

FIG. 2 is a control block diagram of the driver assistance system according to an embodiment.

Referring to FIG. 2, the driver assistance system 100 may include a camera 110, a front radar 120, a corner radar 130, a behavior sensor 140, and a controller 200.

The controller 200 may perform overall control of the driver assistance system 100.

The camera 110, the front radar 120, the corner radar 130, and the behavior sensor 140 may be electrically connected to the controller 200.

The controller 200 may control the steering device 40 and the AVN device 60. In addition, other electronic devices of the vehicle 1 may be electrically connected to the controller 200.

Each of the camera 110, the front radar 120, the corner radar 130, and the behavior sensor 140 may include an electronic control unit (ECU). The controller 200 may be implemented as an integrated controller including the electronic control unit of the camera 110, the electronic control unit of the front radar 120, the electronic control unit of the corner radar 130, and the electronic control unit of the behavior sensor 140.

The camera 110 may photograph the front of the vehicle 1 and identify other vehicles, pedestrians, cyclists, lanes, road signs, and the like.

The camera 110 may include a plurality of lenses and an image sensor. The image sensor may include a plurality of photodiodes converting light into an electrical signal, and the plurality of photodiodes may be arranged in a two-dimensional matrix.

The camera 110 may be electrically connected to the controller 200. For example, the camera 110 may be connected to the controller 200 through the vehicle communication network NT, or may be connected to the controller 200 through a hard wire, or may be connected to the controller 200 through a printed circuit board (FOB).

The camera 110 may transmit data of an image in front of the vehicle 1 to the controller 200.

The front radar 120 and the corner radar 130 may obtain a relative position, a relative speed, and the like of an object (e.g., another vehicle, a pedestrian, a cyclist, etc.) around the vehicle 1.

The front radar 120 and the corner radar 130 may be connected to the controller 200 through the vehicle communication network (NT) or a hard wire or a printed circuit board.

The front radar 120 and the corner radar 130 may transmit radar data to the controller 200. The radars may be implemented as a lidar.

The behavior sensor 140 may obtain behavior data of the vehicle 1. For example, the behavior sensor 140 may include a speed sensor to detect a speed of the wheel, an acceleration sensor to detect a lateral acceleration and a longitudinal acceleration of the vehicle, yaw rate sensor to detect a change in an angular speed of the vehicle, a gyro sensor to detect an inclination of the vehicle, a steering angle sensor to detect a rotation and steering angle of the steering wheel, and/or a torque sensor to detect a steering torque of the steering wheel. The behavior data may include the speed, longitudinal acceleration, lateral acceleration, steering angle, steering torque, driving direction, yaw rate and/or inclination of the vehicle 1.

The controller 200 may include a processor 210 and a memory 220.

The controller 200 may include the one or more processors 210. The one or more processors 210 included in the controller 200 may be integrated into one chip or may be physically separated. The processor 210 and the memory 220 may also be implemented as a single chip.

The processor 210 may process image data of the camera 110, front radar data of the front radar 120, and corner radar data of the corner radar 130. The processor 210 may also generate a steering signal for controlling the steering device 40 and an AVN signal for controlling the AVN device 60.

For example, the processor 210 may include an image signal processor to process the image data of the camera 110, may include a digital signal processor to process the radar data of the radars 120 and 130, and may include a micro control unit (MCU) to generate a steering signal and an AVN signal.

The memory 220 may store a program and/or data for the processor 210 to process the image data. The memory 220 may store a program and/or data for the processor 210 to process the radar data. The memory 220 may also store a program and/or data for the processor 210 to generate a control signal for the configuration of the vehicle 1.

The memory 220 may temporarily store the image data received from the camera 110 and/or the radar data received from the radars 120 and 130. The memory 220 may also temporarily store a result of the processor 210 processing the image data and/or radar data. The memory 110 may include not only a volatile memory such as a S-RAM and a D-RAM, but also a non-volatile memory such as a flash memory, a read-only memory (ROM), and an erasable programmable read-only memory (EPROM).

Figure 3:
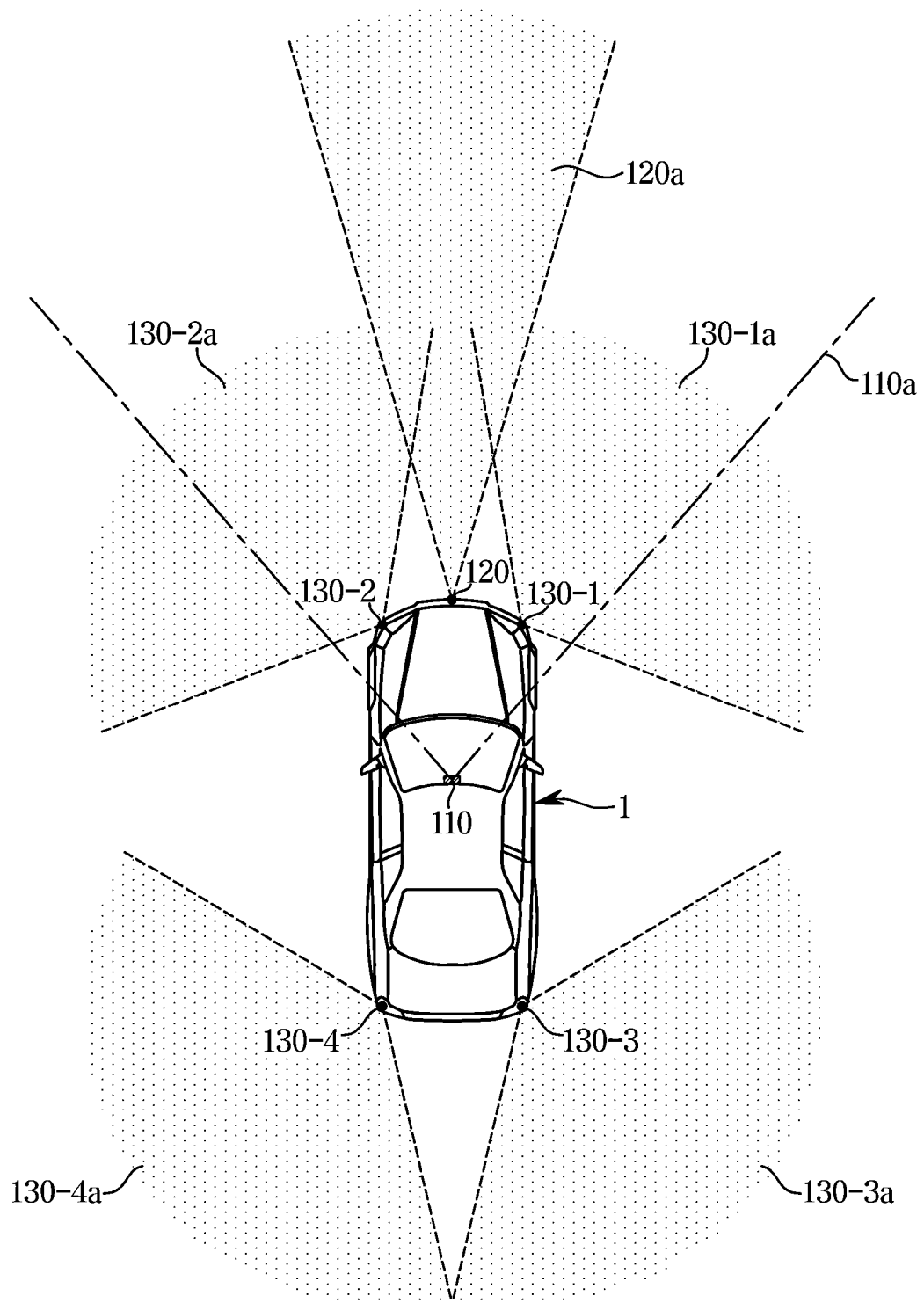
FIG. 3 illustrates a camera and a radar of the driver assistance system according to an embodiment.

FIG. 3 illustrates a camera and a radar of the driver assistance system according to an embodiment.

Referring to FIG. 3, the camera 110 may have a field of view 110a facing the front of the vehicle 1. For example, the camera 110 may be installed on a front windshield of the vehicle 1. The camera 110 may photograph the front of the vehicle 1 and obtain image data of the front of the vehicle 1. The image data of front of the vehicle 1 may include location information of other vehicles or pedestrians or cyclists or lanes located in front of the vehicle 1.

The front radar 120 may have a field of sensing 120a facing the front of the vehicle 1. The front radar 120 may be installed, for example, on a grille or a bumper of the vehicle 1.

The front radar 120 may include a transmission antenna (or a transmission antenna array) to radiate a transmitting radio wave toward the front of the vehicle 1, and a receiving antenna (or a receiving antenna array) to receive a reflected radio wave reflected by an object. The front radar 120 may obtain front radar data from the transmitted radio wave transmitted by the transmission antenna and the reflected radio wave received by the receiving antenna. The front radar data may include distance information and speed information on other vehicles or pedestrians or cyclists located in front of the vehicle 1. The front radar 120 may calculate a relative distance to the object based on a phase difference (or time difference) between the transmitted radio wave and the reflected radio wave, and may calculate a relative speed of the object based on a frequency difference between the transmitted radio wave and the reflected radio wave.

The corner radar 130 may include a first corner radar 130-1 installed on a front right side of the vehicle 1, a second corner radar 130-2 installed on a front left side of the vehicle 1, a third corner radar 130-3 installed on a rear right side of the vehicle 1, and a fourth corner radar 130-4 installed on a rear left side of the vehicle 1.

The first corner radar 130-1 may have a field of sensing 130-1a facing the front right side of the vehicle 1, The second corner radar 132 may have a field of sensing 130-2a facing the front left side of the vehicle 1, the third corner radar 130-3 may have a field of sensing 130-3a facing the rear right side of the vehicle 1, and the fourth corner radar 130-4 may have a field of sensing 130-4a facing the rear left side of the vehicle 1.

Each of the corner radars 130 may include a transmission antenna and a receive antenna. The first, second, third, and fourth corner radars 130-1, 130-2, 130-3, and 130-4 may obtain first corner radar data, second corner radar data, third corner radar data, and fourth corner radar data, respectively. The first corner radar data may include distance information and speed information of an object located on the front right side of the vehicle 1. The second corner radar data may include distance information and speed information of an object located on the front left side of the vehicle 1. The third and fourth corner radar data may include distance information and speed information of objects located on the rear right side of the vehicle 1 and the rear left side of the vehicle 1, respectively.

Referring to FIG. 2, the controller 200 may detect and/or identify objects (e.g., other vehicles, pedestrians, cyclists, lanes, etc.) located in front of the vehicle 1 based on the front image data of the camera 110 and the front radar data of the front radar 120, and may obtain location information (distance and direction) and speed information (relative speed)

of objects located in front of the vehicle 1. Also, the processor 210 may obtain location information (distance and direction) and speed information (relative speed) of objects located on sides (front right, front left, rear right, rear left) of the vehicle 1 based on the corner radar data of the plurality of corner radars 130.

The controller 200 may obtain a state of the emergency light and the direction indicator lamp of the vehicle 1. The controller 200 may receive the state of the emergency light and the direction indicator lamp from another system mounted on the vehicle 1 or obtain the state by itself.

The controller 200 may obtain a driving mode of the vehicle 1. The driving mode may include a Normal mode, an Eco mode, a Comfort mode, and a Sport mode. The Sport mode is a mode for enabling driving in a state in which power performance is prioritized over fuel efficiency compared to the Normal mode. The Eco mode is a mode for enabling driving in a state in which fuel efficiency is prioritized over power performance compared to the Normal mode. The Comfort mode may be a mode between the Eco mode and the Normal mode or a mode between the Normal mode and the Sport mode. The driving mode is switched to any one of the Eco mode, the Normal mode, the Comfort mode, and the Sport mode. The driving mode may be switched by the driver or by the vehicle itself.

The state of the driving mode of the controller 200 may be provided from another system mounted on the vehicle 1 or may be obtained by itself.

The controller 200 may determine whether the driving situation corresponds to a situation that the driver override determination needs to be dualized while the lane following assist system is operating such that the lane following assist control is in progress, and may adjust at least one of the attenuation amount of the required steering torque and the threshold value of the driver override determination depending on the determined situation.

The controller 200 may determine the driving situation by using a variety of information of the vehicle 1 including the front image data, radar data, emergency light/direction indicator lamp state, driving mode state, and the like, and while the lane following assist system is operating such that the lane following assist control is in progress, and may adjust the attenuation amount of the required steering torque and the threshold value of the driver override determination depending on the determined situation. The required steering torque value may be a steering torque value required to be generated by the steering device 40 to keep vehicle 1 in the center of the lane. The threshold value of the driver override determination may be a reference value for determining steering intervention of the driver in order to hand over the steering control to the driver. For example, when a steering torque by the driver is greater than the threshold value of the driver override determination, the controller 200 may determine that it is the steering intervention of the driver, stop the operation by the lane following assist system, and may be switched to a driver override state in which the steering control is handed over to the driver. Conversely, when the steering torque by the driver is less than the threshold value of the driver override determination, the controller 200 may determine that the steering intervention of the driver has disappeared, and may start the operation by the lane following assist system again.

Figure 4:
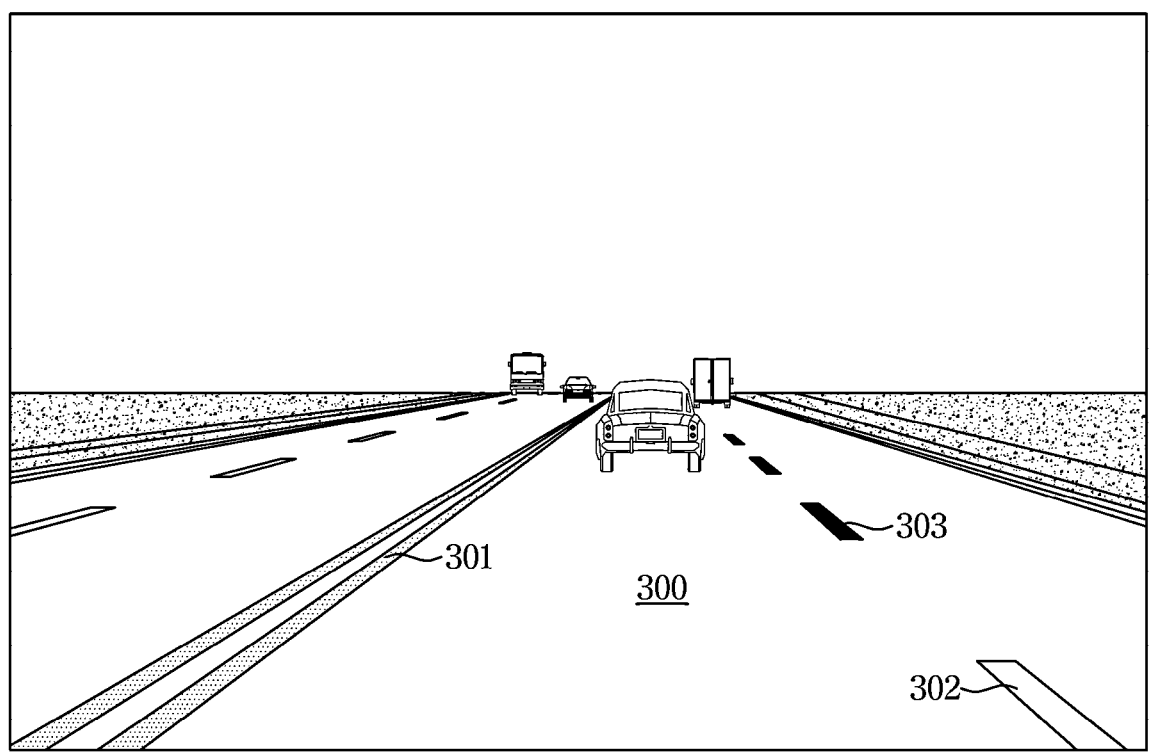
FIGS. 4 and 5 illustrate that an attenuation amount of a required steering torque and a threshold value of driver override determination are adjusted in a driving situation in which the vehicle keeps the center of a lane by creating a virtual lane in the driver assistance system according to an embodiment.
Figure 5:
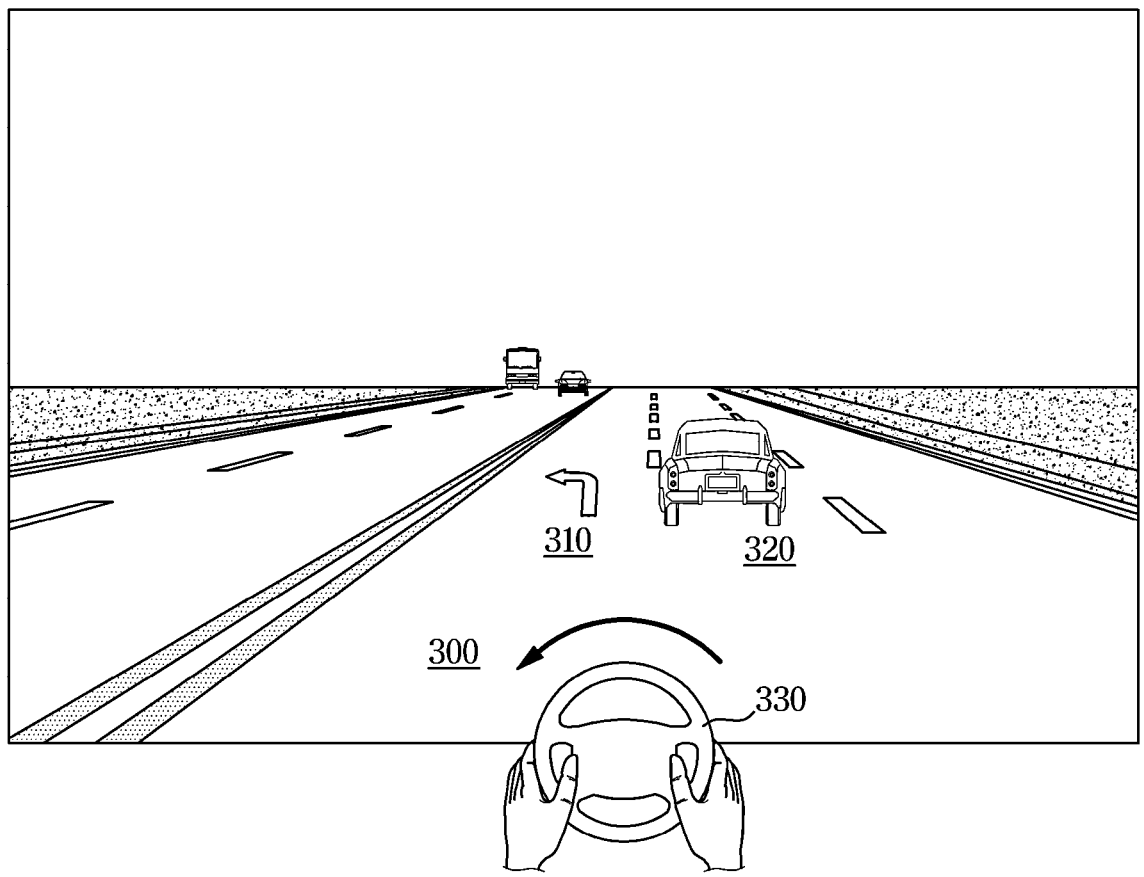

FIGS. 4 and 5 illustrate that an attenuation amount of a required steering torque and a threshold value of driver override determination are adjusted in a driving situation in which the vehicle keeps the center of a lane by creating a virtual lane in the driver assistance system according to an embodiment.

Referring to FIGS. 4 and 5, when one lane 302 of a lane 301 and the lane 302 on a driving lane 300 is unrecognized while the lane following assist system is operating, the controller 200 creates a virtual lane 303 based on the opposite lane 301 to control the required steering torque to follow the center of the virtual lane 303.

In this case, an actual driving direction desired by the driver and a road in which the lane following assist system is following the center of a lane may be different depending on a driving situation. For example, this situation is a situation in which the first lane 300 of a three-lane road is widened and is changed to two lanes 310 and 320, the first lane 310 of the two lanes 310 and 320 is changed to a left turn lane, and the vehicle travels in the second lane 320 which is a straight lane.

That is, for the center of the lane in a situation where the first lane of the three lanes is widened and the right lane disappears, a conventional system generally creates a virtual lane based on the left lane to perform center following. In this state, assuming that the first lane 300 is divided into the two lanes 310 and 320, and the first lane 310 is changed to a left turn lane and the second lane 320 is changed to a straight lane, when the driver intervenes steering to change the lane from the first lane 310 to the second lane 320 for driving straight ahead, a counterclockwise steering demand torque applied to the steering wheel 330 for the current center following like shown by an arrow prevents this intervention. Due to this, a sense of incongruity may be given to steering of the driver, so that the driver may feel uncomfortable.

As such, by appropriately adjusting the attenuation amount of the required steering torque of the lane following assist system and the threshold value of the driver override determination in a driving situation in which steering intervention of the driver is required, a sense of incongruity for steering of the driver may be reduced and completeness of the system may be improved.

Figure 6:
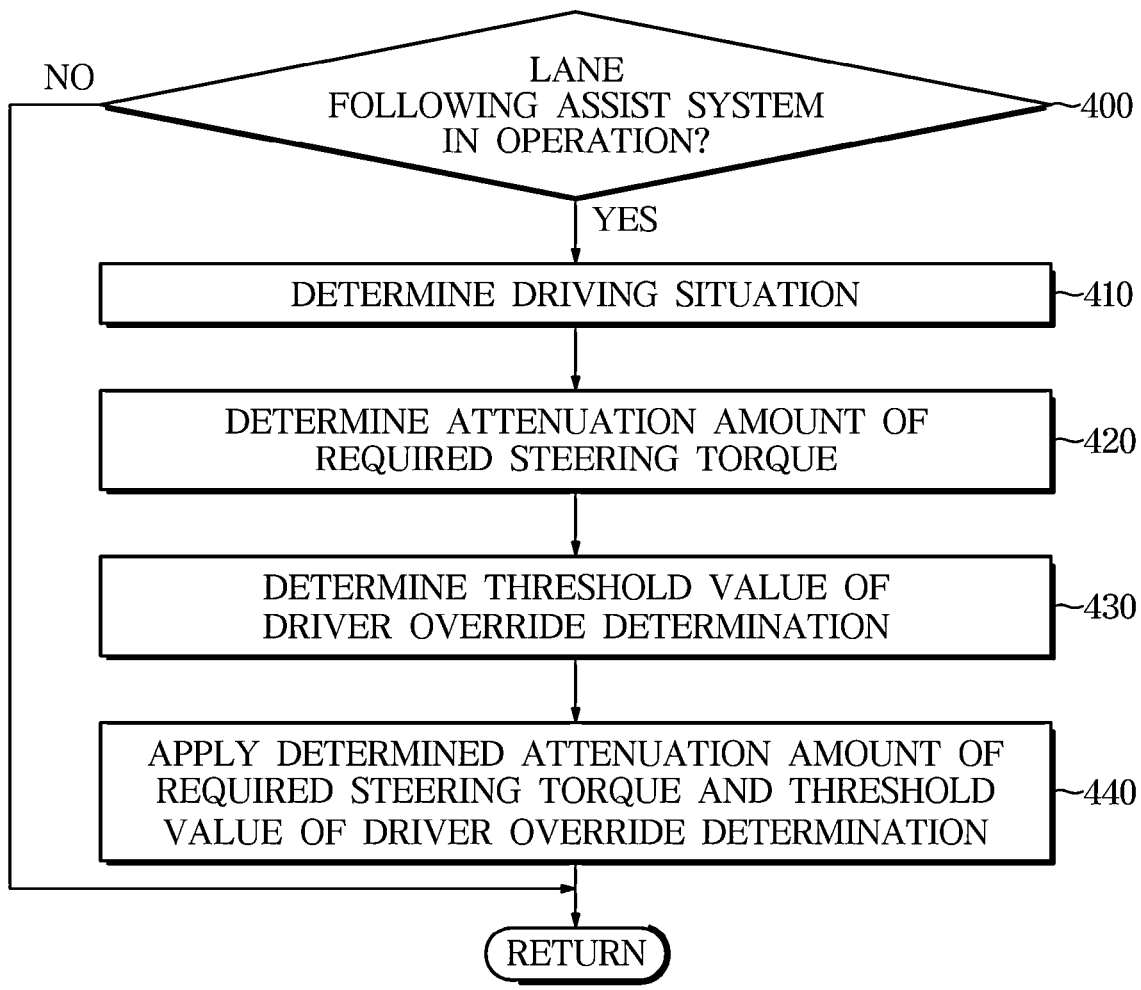
FIG. 6 is a flowchart illustrating a method of controlling the driver assistance system according to an embodiment.

FIG. 6 is a flowchart illustrating a method of controlling the driver assistance system according to an embodiment, and FIG. 7 is a table illustrating adjustment of the attenuation amount of the required steering torque and the threshold value of the driver override determination for each driving situation in the driver assistance system according to an embodiment.

Referring to FIGS. 6 and 7, a control method of the driver assistance system according to an embodiment may include determining whether the lane following assist system is in operation (400), determining a driving situation when the lane following assist system is in operation (410), determining an attenuation amount of a required steering torque depending on the determined driving situation (420), determining a threshold value of driver override determination depending on the determined driving situation (430), and applying the determined attenuation amount of the required steering torque and the determined threshold value of the driver override determination to the system.

The controller 200 determines whether the lane following assist system is in operation. The controller 200 identifies opposite lanes of the driving lane through lane following assist control when the lane following assist system is operated, and controls a required steering torque to keep the vehicle in the center of the lane based on distances from the center of the vehicle to the opposite lanes, thereby driving the vehicle in the center of the lane. The controller 200 may perform the lane following assist control in an autonomous driving state where the lane following assist system is in operation and there is no driver intervention.

The controller 200 may determine the driving situation when the lane following assist system is in operation.

The controller 200 may determine whether the driving situation is a situation in which steering intervention of the driver is required.

The controller 200 may determine the driving situation as a normal driving situation when the driving situation is not the situation in which steering intervention of the driver is required. For example, when the driving situation is the normal/Echo/Comfort mode in the situation in which steering intervention of the driver is not required, or when the driving situation is not the situation in which steering intervention of the driver is required and not the normal/Echo/Comfort mode, the controller 200 may determine the driving situation as the normal driving situation when the driving situation is a non-highway driving situation.

When the driving situation is a virtual lane creation situation, preceding vehicle-following situation, Sport mode situation, and direction indicator lamp and/or emergency light application situation, the controller 200 may determine the driving situation as the situation in which steering intervention of the driver is required. The controller 200 may determine that the driving situation is the virtual lane creation situation when one lane of driving lanes is unrecognized, a branching lane, or has a lane width wider than a reference lane width.

The controller 200 may determine the attenuation amount of the required steering torque depending on the current driving situation among the driving situations.

When the driving situation is the virtual lane creation situation, preceding vehicle-following situation, direction indicator lamp and/or emergency light application situation, or Sport mode situation, the controller 200 may determine the attenuation amount of the required steering torque as an attenuation amount that is more aggressively attenuated than in the normal driving situation.

When the driving situation is the virtual lane creation situation, preceding vehicle-following situation, direction indicator lamp and/or emergency light application situation, or Sport mode situation, the controller 200 may determine the attenuation amount of the required steering torque to be an attenuation amount increased more than an attenuation amount of a required steering torque in the normal driving situation (reference attenuation amount of the required steering torque).

When the driving situation is the virtual lane creation situation or preceding vehicle-following situation, the controller 200 may determine that it is a situation in which a driving path is uncertain, and thus may determine that an aggressive attenuation of the required steering torque value is required than in the normal driving situation.

Because the driving situation is a situation in which intervention of the driver is high when the driving situation is the direction indicator lamp and/or emergency light application situation or Sport mode situation, the controller 200 may determine that an aggressive attenuation of the required steering torque value is required than in the normal driving situation.

As such, as the attenuation amount of the required steering torque is determined by reflecting the aggressive attenuation of the required steering torque value for the above driving situations, in a case in which this is later applied to the system, a required existing steering torque value applied to the steering wheel in order to follow the center of the lane may be rapidly reduced, thereby reducing a degree of interference with the driver and shortening the time. Due to this, the driver may feel less discomfort in the steering feel.

When the driving situation is the normal/Eco mode and the non-highway driving situation, the controller 200 may determine the required steering torque value as a value decreased like a normal attenuation in the normal driving situation, rather than the aggressive attenuation as in the existing method. Accordingly, when the driving situation is the normal/Eco mode and the non-highway driving situation, the controller 200 may maintain a reference attenuation amount of the required steering torque, which is a preset attenuation amount of the required steering torque, without changing the attenuation amount of the required steering torque.

For example, the aggressive attenuation has a larger attenuation amount than the normal attenuation, and may be attenuated by 100% (2 times) compared to the normal attenuation.

The controller 200 may determine the threshold value of the driver override determination depending on the current driving situation among the driving situations. The threshold value of driver override determination is a threshold value for determining driver steering override, and may be a required steering torque value for transferring the right of steering control to the driver and handing over the steering control to the driver.

When the driving situation is the virtual lane creation situation, preceding vehicle-following situation, direction indicator lamp and/or emergency light application situation, or Sport mode situation, the controller 200 may determine the threshold value of the driver override determination to be a decreased value (decrease of threshold value) more than the threshold value (reference threshold value) of the driver override determination in the normal driving situation. For example, the reference threshold value may be 2.0 Nm, and the decrease of the threshold value may be 0.5 Nm.

When the driving situation is the virtual lane creation situation or preceding vehicle-following situation, the controller 200 may determine that it is a situation in which a driving path is uncertain, and thus may determine that the threshold value of the driver override determination is required to be decreased.

The controller 200 may determine that the driving situation is the situation in which the intervention of the driver is high when the driving situation is the direction indicator lamp and/or emergency light application situation or Sport mode situation, and thus may determine that the threshold value of the driver override determination is required to be decreased.

As such, as the threshold value of the driver override determination is determined such that the threshold value of the driver override determination is decreased more than in the normal driving situation in the above situations, in a case in which this is later applied to the system, the steering control may be handed over to the driver at an early stage, so that the driver may feel less discomfort in the steering feel.

As the controller 200 applies at least one of the attenuation amount of the required steering torque determined to correspond to the driving situation and the threshold value of the driver override determination to the lane following assist system, a sense of incongruity in the steering feel of the driver may be less felt.

As is apparent from the above, an embodiment of the disclosure, a sense of incongruity for steering of a driver can be reduced and completeness of a system can be improved by adjusting an attenuation amount of a required steering torque of the system and a threshold value of driver override determination depending on a driving situation while the lane following assist system is operating.

Herein, the aforementioned controller and/or components thereof may include one or more processors/microprocessors combined with a computer-readable recording medium storing computer-readable code/algorithm/software.

The processors/microprocessors may execute the computer-readable code/algorithm/software stored in the computer-readable recording medium to perform the above-described functions, operations, steps, and the like.

The above-described controller and/or components thereof may further include a memory implemented as a computer-readable non-transitory recording medium or a computer-readable temporary recording medium. The memory may be controlled by the aforementioned controller and/or components thereof, and may be configured to store data transferred to or received from the aforementioned controller and/or components thereof, or may be configured to store data to be processed or processed by the aforementioned controller and/or components thereof.

The disclosed embodiments may be implemented as computer-readable code/algorithm/software on a computer-readable recording medium. The computer-readable recording medium may be a computer-readable non-transitory recording medium such as a data storage device capable of storing data readable by a processor/microprocessor. Examples of computer-readable recording media include hard disk drives (HDDs), solid state drives (SSDs), silicon disk drives (SDDs), read-only memory (ROM), CD-ROMs, magnetic tapes, floppy disks, optical data storage devices. etc.

What is claimed is:

1. A driver assistance system, which performs lane following assist control to keep a vehicle in the center of a lane by generating a required steering torque by a lane following assist system, comprising
    a controller configured to determine whether a driving situation is a situation in which steering intervention of a driver is required when the lane following assist control is performed, and adjust an attenuation amount of a required steering torque and a threshold value of a driver override determination for determining a driver override when the driving situation is the situation in which the steering intervention of the driver is required,
    wherein an attenuation amount of a required steering torque adjusted when the situation in which the steering intervention of the driver is required is a virtual lane creation situation or a preceding vehicle-following situation is set to be greater than an attenuation amount of a required steering torque adjusted when the situation in which the steering intervention of the driver is required is a normal driving situation other than the virtual lane creation situation and the preceding vehicle-following situation,
    the controller is configured to determine that the driving situation is the situation in which the steering intervention of the driver is required when the driving situation is the virtual lane creation situation, and
    the controller is configured to determine that the driving situation is the virtual lane creation situation when one lane of driving lanes is unrecognized, a branching lane, or has a lane width wider than a reference lane width while the lane following assist control is being performed.

2. The driver assistance system according to claim 1, wherein
    the controller is configured to determine that the driving situation is the situation in which the steering intervention of the driver is required when the driving situation is the preceding vehicle-following situation.

3. The driver assistance system according to claim 1, wherein
    the driving mode of the vehicle comprises a Normal mode, an Eco mode, a Comfort mode, and a Sport mode that prioritizes power performance over fuel efficiency compared to the modes, and
    the controller is configured to determine that the driving situation is the situation in which the intervention of the driver is required when the driving mode is the Sport mode.

4. The driver assistance system according to claim 1, wherein
    the controller is configured to determine that the driving situation is the situation in which the steering intervention of the driver is required when the driving situation is a direction indicator lamp or emergency light application situation.

5. The driver assistance system according to claim 1, wherein
    the controller, when the driving situation is the situation in which the steering intervention of the driver is required, increases the attenuation amount of the required steering torque more than an attenuation amount of a required steering torque in the normal driving situation.

6. The driver assistance system according to claim 5, wherein
    the attenuation amount of the required steering torque in the driving situation in which the steering intervention of the driver is required is attenuated twice as much as the attenuation amount of the required steering torque in the normal driving situation.

7. The driver assistance system according to claim 1, wherein
    the controller, when the driving situation is the situation in which the steering intervention of the driver is required, adjusts the threshold value of the driver override determination to be a threshold value decreased more than a reference threshold value in the normal driving situation.

8. The driver assistance system according to claim 7, wherein
    the reference threshold value is 2.0 Nm, and the threshold value of the driver override determination is adjusted to be 1.5 Nm.

9. The driver assistance system according to claim 1, wherein the required steering torque is required to be generated by the lane following assist system to keep the vehicle in the center of the lane.

10. A driver assistance system, which performs lane following assist control to keep a vehicle in the center of a lane by generating a required steering torque by a lane following assist system, comprising
    a controller configured to determine a driving situation when the lane following assist control is performed, determine an attenuation amount of a required steering torque and a threshold value of a driver override determination for determining a driver override depending on the determined driving situation, and apply the determined attenuation amount of the required steering torque and the determined threshold value of the driver override determination to the lane following assist control, wherein an attenuation amount of a required steering torque adjusted when the situation in which the steering intervention of the driver is required is a virtual lane creation situation or a preceding vehicle-following situation is determined to be greater than an attenuation amount of a required steering torque adjusted when the situation in which the steering intervention of the driver is required is a normal driving situation other than the virtual lane creation situation and the preceding vehicle-following situation, the controller is configured to determine that the driving situation is the situation in which the steering intervention of the driver is required when the driving situation is the virtual lane creation situation, and the controller is configured to determine that the driving situation is the virtual lane creation situation when one lane of driving lanes is unrecognized, a branching lane, or has a lane width wider than a reference lane width while the lane following assist control is being performed.

11. A control method of a driver assistance system, which performs lane following assist control to keep a vehicle in the center of a lane by generating a required steering torque by a lane following assist system, comprising:

determining whether a driving situation is a situation in which steering intervention of a driver is required when the lane following assist control is performed; and adjusting an attenuation amount of a required steering torque and a threshold value of a driver override determination for determining a driver override when the driving situation is the situation in which the steering intervention of the driver is required, wherein an attenuation amount of a required steering torque adjusted when the situation in which the steering intervention of the driver is required is a virtual lane creation situation or a preceding vehicle-following situation is set to be greater than an attenuation amount of a required steering torque adjusted when the situation in which the steering intervention of the driver is required is a normal driving situation other than the virtual lane creation situation and the preceding vehicle-following situation, the determining of whether the driving situation is the situation in which the steering intervention of the driver is required comprises determining that the driving situation is the situation in which the steering intervention of the driver is required when the driving situation is the virtual lane creation situation, and the determining of whether the driving situation is the situation in which the steering intervention of the driver is required comprises determining that the driving situation is the virtual lane creation situation when one lane of driving lanes is unrecognized, a branching lane, or has a lane width wider than a reference lane width while the lane following assist control is being performed.

12. The control method according to claim 11, wherein the determining of whether the driving situation is the situation in which the steering intervention of the driver is required comprises determining that the driving situation is the situation in which the steering intervention of the driver is required when the driving situation is the preceding vehicle-following situation.

13. The control method according to claim 11, wherein the driving mode of the vehicle comprises a Normal mode, an Eco mode, a Comfort mode, and a Sport mode that prioritizes power performance over fuel efficiency compared to the modes, and the determining of whether the driving situation is the situation in which the steering intervention of the driver is required comprises determining that the driving situation is the situation in which the intervention of the driver is required when the driving mode is the Sport mode.

14. The control method according to claim 11, wherein the determining of whether the driving situation is the situation in which the steering intervention of the driver is required comprises determining that the driving situation is the situation in which the steering intervention of the driver is required when the driving situation is a direction indicator lamp or emergency light application situation.

15. The control method according to claim 11, wherein the adjusting of the attenuation amount of the required steering torque and the threshold value of the driver override determination comprises, when the driving situation is the situation in which the steering intervention of the driver is required, increasing the attenuation amount of the required steering torque more than an attenuation amount of a required steering torque in the normal driving situation.

16. The control method according to claim 11, wherein the adjusting of the attenuation amount of the required steering torque and the threshold value of the driver override determination comprises, when the driving situation is the situation in which the steering intervention of the driver is required, decreasing the threshold value of the driver override determination more than a threshold value of a driver override determination in the normal driving situation.

* * * * *